(12) United States Patent
Damnjanovic

(10) Patent No.: US 6,917,812 B2
(45) Date of Patent: Jul. 12, 2005

(54) AIR INTERFACE SCHEDULER FOR WIRELESS COMMUNICATION NETWORKS

(75) Inventor: Aleksandar Damnjanovic, San Diego, CA (US)

(73) Assignee: Telefonaktiebolaget LM Ericsson (publ) (SE)

(*) Notice: Subject to any disclaimer, the term of this patent is extended or adjusted under 35 U.S.C. 154(b) by 590 days.

(21) Appl. No.: 10/005,980

(22) Filed: Dec. 3, 2001

(65) Prior Publication Data

US 2003/0104817 A1 Jun. 5, 2003

(51) Int. Cl.[7] .................................................. H04Q 7/20
(52) U.S. Cl. .............................. 455/452.2; 455/452.1; 455/453; 455/517; 370/231; 370/235; 370/395.4
(58) Field of Search ........................ 455/452.1, 452.2, 455/453, 517, 519, 524, 525; 370/231–235, 395.21–395.43

(56) References Cited

U.S. PATENT DOCUMENTS

| | | | | |
|---|---|---|---|---|
| 5,752,193 A | * | 5/1998 | Scholefield et al. ...... | 455/452.2 |
| 6,469,982 B1 | * | 10/2002 | Henrion et al. ............ | 370/230 |
| 6,564,061 B1 | * | 5/2003 | Guo et al. .................. | 455/453 |
| 6,654,374 B1 | * | 11/2003 | Fawaz et al. ............... | 370/394 |

OTHER PUBLICATIONS

'Charging and Rate Control for Elastic Traffic', Frank Kelly, Univ. of Cambridge, (16 pages) 1997.
'Providing Quality of Service Over A Shared Wireless Link', Matthew Andrews, Krishnan Kumaran, Kavita Ramanan, Alexander Stolyar, and Phil Whiting, Lucent Technologies, Rajiv Vijayakumar, Univ. of Michigan (5 pages) Feb. 2001.
'CDMA Data Qos Scheduling on the Forward Link with Variable Channel Conditions', Matthew Andrews, Krishnan Kumaran, Kavita Ramanan, Alexander Stolyar, Rajiv Vijayakumar, Phil Whiting, Bell Labs, Lucent Technologies 600–700 Mountain Avenue, Murray Hill, NJ 07974–0636 (45 pages) Apr. 2000.
A Study of Scheduling Algorithms for a Mixture of Real and Non–Real Time Data in HDR, Sanjay Shakkottai, Coordinated Science Laboratory and Department of Electrical and Computer Engineering, Univ. of Illinois at Urbana–Champaign, Alexander Stolyar, Mathematical Sciences Research Center, Bell Labs, Lucent Technologies, 600 Mountain Avenue, Murray Hill, NJ 07974 (20 pages) Oct. 2000.
'Largest Weighted Delay First Scheduling: Large Deviations and Optimality', Alexander L. Stolyar and Kavita Ramanan, Bell Labs, Lucent Technologies, Murray Hill, NJ 07974 (50 pages) Feb. 2000.
'Multiuser Diversity in Wireless Networks', David Tse, WOW Seminar, (4 pages) Jan. 2001.

* cited by examiner

Primary Examiner—Stephen M. D'Agosta
(74) Attorney, Agent, or Firm—Coats & Bennett, P.L.L.C.

(57) ABSTRACT

A scheduler permits efficient and flexible scheduling between simultaneous users of an air interface in a wireless communication networks in consideration of desired QoS parameters and class-based preferential scheduling. By appropriately defining the utility functions used by the scheduler in user scheduling, scheduling may, among other goals, be biased toward satisfaction of average or minimum throughput constraints, be biased toward meeting QoS delay constraints, or be biased based on combined considerations of these goals. Where QoS delay constraints are considered, the scheduler might adopt a dynamic approach to updating delay terms in the utility functions, such that users are not over-served or underserved relative to a desired quality of service.

50 Claims, 9 Drawing Sheets

AIR INTERFACE SCHEDULER FOR WIRELESS COMMUNICATION NETWORKS

BACKGROUND OF THE INVENTION

The present invention generally relates to scheduling multiple users sharing a communication resource, and particularly relates to scheduling shared use of the air interface in high data rate (HDR) wireless communication networks.

In some types of wireless communication networks, such as those configured in accordance with TIA/EIA/IS-856 standards, the forward link air interface is shared by a plurality of access terminals (users). At each time slot, or more generally, at each scheduling point, the network must decide which user or users to serve. This process of selecting users for service is generally referred to as "scheduling," and the particular approach to scheduling adopted by a network determines at least in part several notable aspects of network operation. These aspects include overall network sector throughput, and the individual service rates of the users.

One existing approach, referred to as "proportional fair scheduling," attempts, at each scheduling point, to serve the user having the largest ratio of requested service rate to average served rate. Thus, proportional fair scheduling selects the most underserved user relative to requested rate. Proportional fair schedulers, while well known, suffer significant limitations.

As an example, proportional fair scheduling does not accommodate differing quality-of-service requirements (QoS) between competing users, i.e., it does not consider maximum acceptable data delay constraints. Further, proportional fair scheduling does not support minimum service rates for users. On the other hand, proportional fair scheduling has several attractions.

First among these attractions are its relative simplicity and computational efficiency. As a gradient-based scheduling algorithm, proportional fair scheduling uses partial differentiation of the set of utility functions associated with the users being scheduled. Since each service hypothetical involves only one user at a time, partial differentiation with respect to the non-served users is simplified. Further, the gradient-based (steepest descent) approach to scheduling generally exhibits relatively fast convergence towards the optimum scheduling solution. Of course, because of the differentiability requirement, gradient-based scheduling does impose certain limitations on the flexibility of utility functions that may be assigned to users for evaluation by the scheduling algorithm.

Despite the attractions of proportional fair scheduling, its shortcomings are such that alternative scheduling approaches are needed. Approaches that begin accommodating QoS considerations include Largest Weighted Delay First (LWDF) and modified LWDF (M-LWDF) techniques that attempt to meet maximum packet delay requirements associated with desired QoS. However, at the least the LWDF approach effectively assumes constant channel capacity, and thus does not account for varying radio conditions across the set of users and over time.

User scheduling should accommodate minimum service rate considerations to insure that users having adequate radio conditions are served at or above minimum desired service rates. Where desired, such minimum-rate scheduling should further include QoS considerations, where scheduling biases include rate and delay considerations.

BRIEF SUMMARY OF THE INVENTION

The present invention comprises systems and methods for scheduling a communication network resource shared by multiple users in consideration of minimum data throughput requirements to individual users, and, optionally, desired QoS constraints. Thus, resource scheduling may be biased for individual users or for different classes of users based on minimum served rate and QoS considerations. As such, the present invention is directly applicable to scheduling use of the shared forward link air interface in TIA/EIA/IS-856 High Data Rate (HDR) wireless communication networks, and further has direct applicability to future evolutions of that standard.

By incorporating minimum service rate considerations into user utility functions involved in the scheduling calculations, the scheduler of the present invention insures that HDR network users are provided data at least at the defined minimum data rates if radio link conditions are sufficient to support those rates. Individual users or classes of users may be preferentially scheduled by defining higher minimum rates for those users. If desired, all users may be associated with a common minimum rate, and a user variable included within each user's utility function to provide biased or preferential user scheduling. The user variable may be a class variable, where different classes of users might be assigned different values of class variable corresponding to differing scheduling priorities.

As a starting point, the present invention adopts a gradient-based scheduling algorithm, but defines several unique utility functions that support a variety of scheduling goals, including user-class distinction and minimum rate guarantees. In at least some embodiments, the utility functions adopted by the scheduler of the present invention allow service providers to deliver higher data rates to premium users. Thus, users paying higher service charges receive higher average data rates from the network. Where appropriate, this approach may incorporate provisions to insure minimum achievable service rates, or otherwise account for the likelihood that at least some users at any given time will not have radio conditions suitable for supporting even the minimum desired data rate.

In other embodiments, the utility function(s) used by the scheduler of the present invention facilitate achieving higher throughput on a network sector basis rather than on achieving scheduling fairness with regard to one or more users subject to scheduling. In this respect, the present invention provides utility functions that offer scheduling oriented towards "maximum Carrier-to-Interference" (C/I) scheduling, but with provisions to strike a variable balance between fairness and maximum C/I scheduling.

In still other embodiments, the present invention includes one or more adaptive parameters in the utility functions that may be updated using closed-loop control techniques in consideration of whether QoS delay constraints are violated, or on the probability that such constraints will be violated. With such control, the scheduling bias of a given user varies depending on whether the QoS delay constraints associated with that user are being met. If the delay constraints determined by the desired QoS are violated, the utility function of the user is updated such that the preference for scheduling the user increases. Conversely, if the delay constraints are not violated, the scheduling preference decreases. Since these adjustments may be made in closed-loop fashion, the scheduling preference for the user moves toward an optimal scheduling preference.

Other advantages, features, and applications of the present invention will be apparent to those skilled in the art upon reading the following detailed description of some of its exemplary embodiments.

DETAILED DESCRIPTION OF THE INVENTION

Communication systems in general frequently share selected resources between system users. High data rate (HDR) wireless communication networks, such as those configured in accordance with TIA/EIA/IS-856 standards, exemplify such sharing arrangements. In HDR networks, the forward link air interface from a network transmitter to a group of users is shared between those users. That is, the network gives each user forward link service for only a portion of the available time. Selecting which user receives service via the forward link at any given time is referred to as "scheduling."

While the present invention has exemplary applications to scheduling the forward air interface link in HDR communication networks, it should be understood that its various embodiments have application in other types of communication systems, and, indeed, in other types of resource sharing applications where resources are time-shared between a group of users.

Within the context of forward link air interface scheduling, the scheduling technique of the present invention evaluates user utility functions at each scheduling decision point to determine a scheduling metric for each user. The scheduler of the present invention then schedules the user for service that has the greatest or otherwise most favorable scheduling metric. In some embodiments, such as where the air interface allows simultaneous use, the scheduler may select two or more users for service at a given scheduling decision point. The utility functions assigned to the users may depend on desired minimum throughputs for individual users or classes of users, and may also depend on QoS constraints.

Figure 1:
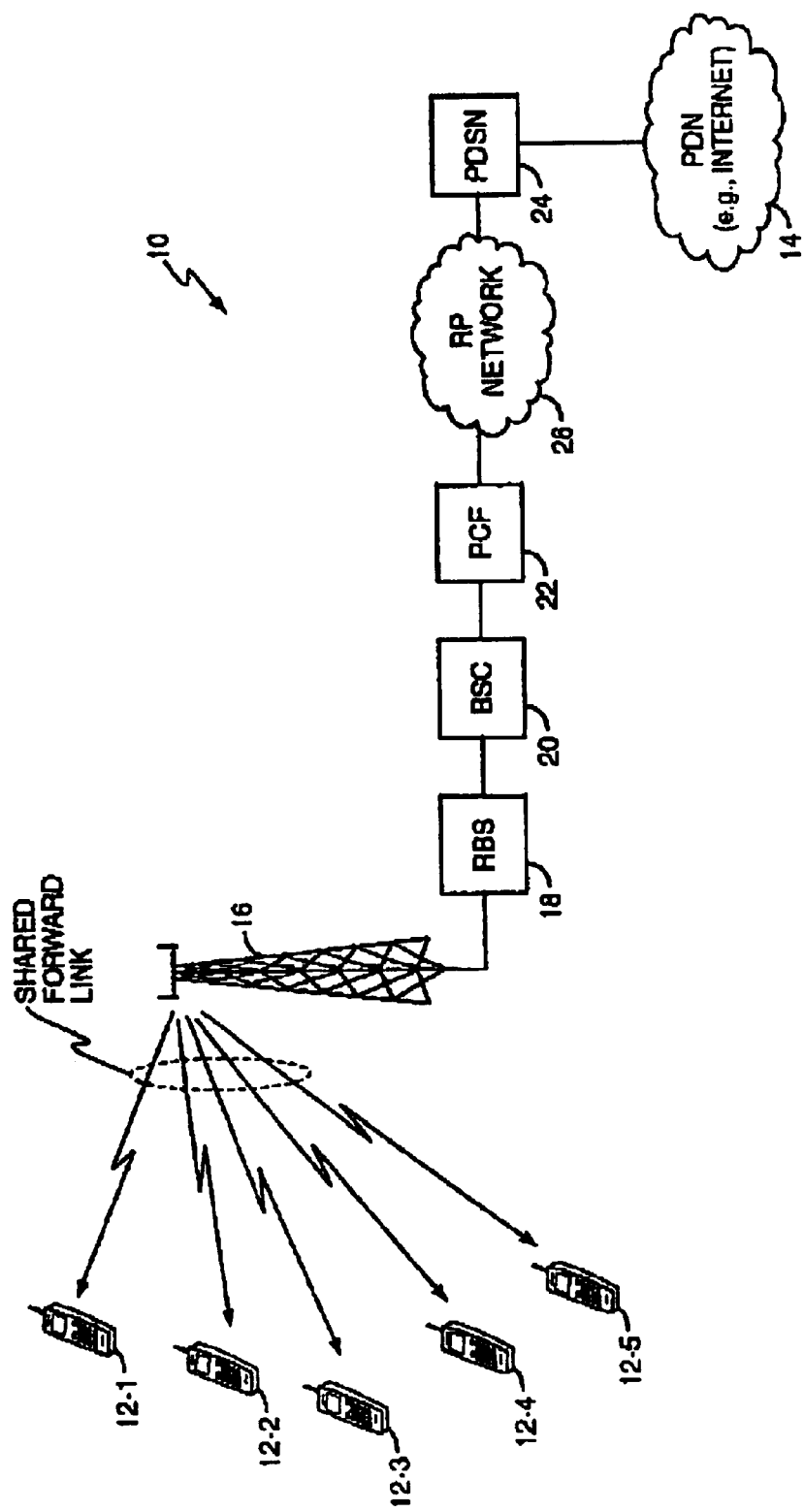
FIG. 1 is a diagram of a wireless communication network serving a number of users.

As a practical illustration, FIG. 1 depicts an exemplary communication network 10, presented in simplified form for clarity. The network 10, which may be a TIA/EIA/IS-856 network, or may be another type of network, supports communication between users (i.e., access terminals (ATs) 12) and one or more public data networks (PDNs) 14, such as the Internet. The ATs are generally referred to by the numeral 12, with specific ATs designated 12-1, 12-2, and so on. It should be understood that where the specification refers to scheduling or serving users, it is implicit that the user's ATs 12 are involved.

The network 10 comprises a RF antenna assembly 16 and an associated radio base station (RBS) 18, a base station controller (BSC) 20, and a packet control function (PCF) 22 coupled to a packet data serving node (PDSN) 24 through a radio-packet (RP) network 26. Generally, the network 10 establishes a set of communication links or channels through the various network entities to permit the exchange of data between the users (i.e., ATs 12) and various systems or servers accessible via the PDN 14. The PDSN 24 routes packet data between the network 10 and the PDN 14 by directing incoming packet data through the RP network 26 to the PCF 22. In turn, the PCF 22 directs the data to the BSC 20, which formats it and provides it to the RBS 18 for transmission to the desired user. Data from the users essentially follows the reverse path.

The RBS 18 may provide radio coverage for one or more radio sectors. Generally, the scheduling of users is performed on a per-sector basis. That is, groups of ATs 12 having the same serving sector compete for forward link air interface service within that sector. Of course, scheduling may be performed at other than sector levels.

The forward link air interface between the network 10 and the users is shared, such that, at a given instant, only selected ones of the eligible users are being served. In the present invention, scheduling which user(s) to serve at each scheduling decision point depends on one or more service goals that might be defined by a network operator, for example.

Figure 2:
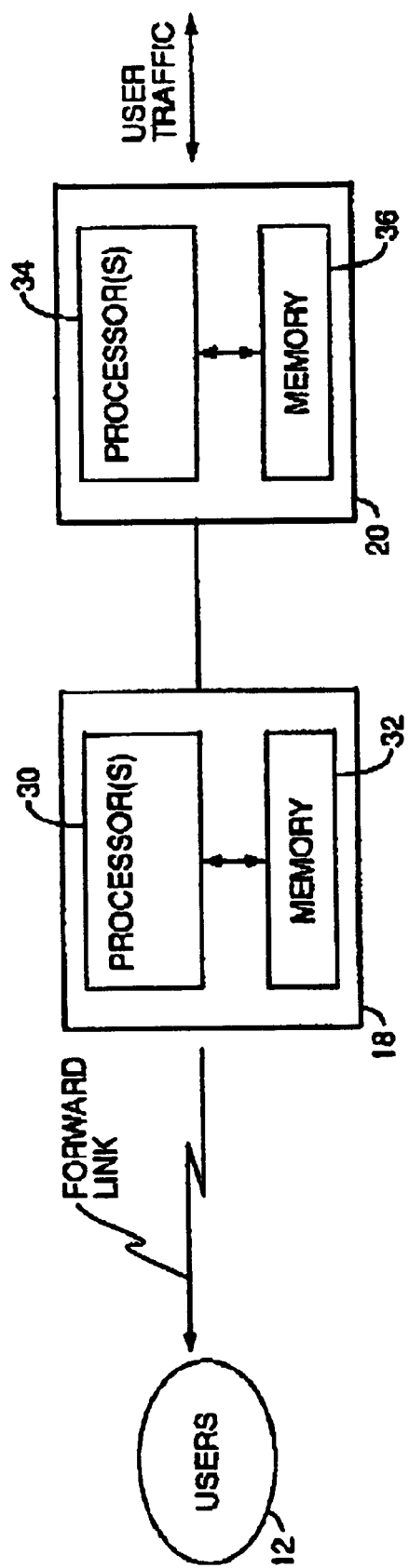
FIG. 2 is a simplified diagram of the network of FIG. 1.

FIG. 2 illustrates an exemplary framework for considering scheduling operations in accordance with various embodiments of the present invention. As noted above, scheduling operations may involve a group of users within a given radio sector of the network 10. As such, user scheduling may be advantageously performed in the RBS 18. In an exemplary embodiment, RBS 18 comprises at least one processor or processing system 30 and associated memory 32. Here, the term "memory" is used generically to refer to any type of memory and/or storage devices. It should also be understood that the processor(s) 30 might include a number of entities responsible for not only user scheduling, but also for radio resource management, timing, operations & maintenance functions, and BSC communications. Typically, the scheduler of the present invention comprises one or more computer programs running on processor(s) 30 and, as such, may be embodied in one or more stored programs or functions held in memory 32.

In other scheduling schemes, it may be advantageous for the BSC 20 to perform scheduling. In an exemplary embodiment, the BSC 20 comprises one or more processors or processing systems 34, along with supporting memory 36. As with the RBS 18, the term "memory" as used in the context of BSC 20 should be understood to encompass essentially any type of memory and/or storage devices.

Regardless of which network entity performs scheduling, the present invention permits scheduling biased for users' desired minimum data throughputs (throughput-based scheduling), for quality-of-service (QoS) considerations (delay-based scheduling), or for various combinations thereof. Of course, scheduling as disclosed herein further encompasses a significant number of variations between throughput- and delay-based scheduling.

Figure 3:
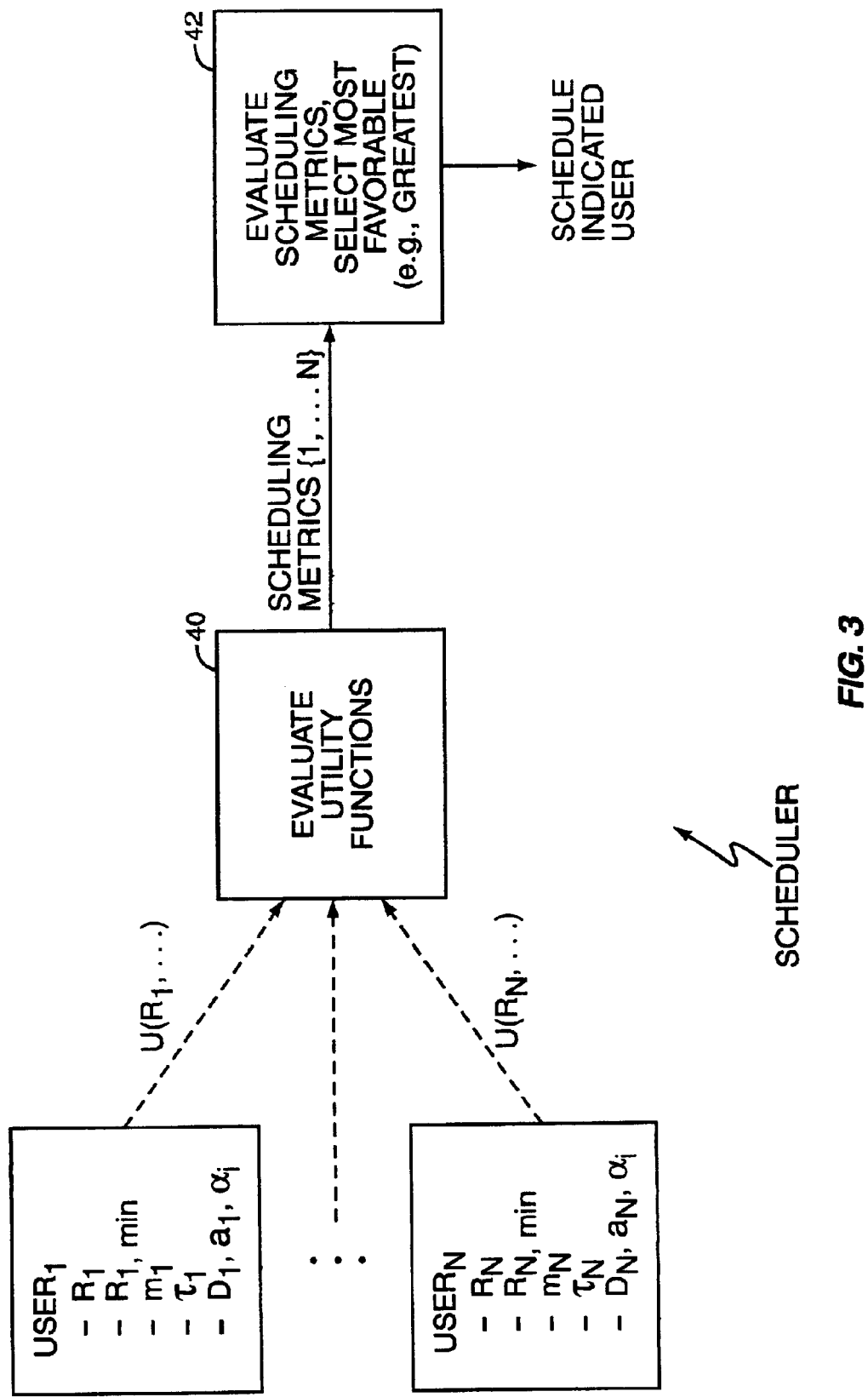
FIG. 3 is a diagram of an exemplary processing flow for the scheduler of the present invention.

FIG. 3 illustrates an exemplary functional arrangement for the scheduler of the present invention, and details some of the scheduling variables considered in various embodiments of the scheduler. The exemplary scheduler, which may be implemented in software, employs a metric calculator 40 that evaluates users' utility functions to determine scheduling metrics for those users. A comparator function 42 then identifies the best or most favorable scheduling metrics, and the corresponding user or users are scheduled for service. This process is generally repeated at successive scheduling decision points In more detail, a utility function $U_i(x)$ is formed for each user subject to scheduling, where "x" represents one or more variables as explained later. For N users, the scheduler evaluates $U_i(x)|_{i=1}^N$ at each scheduling decision point to determine a set of scheduling metrics, which may then be evaluated to select the greatest or otherwise most favorable scheduling metric(s). The user(s) corresponding the best metric(s) are scheduled for service.

An exemplary utility function is expressed as, $$U_i(R_i) = \log(R_i - R_{i,min}), \quad (1)$$

where $R_i$ equals the measured or tracked data throughput to the $i^{th}$ user, and $R_{i,min}$ equals the desired minimum data throughput for that user. It should be understood that $R_i$ could be determined in a number of ways.

In an exemplary implementation for HDR networks, $R_i$ represents the updated average served data rate. As such, $R_i$ can be expressed as, $$R_i(t+1) = \begin{cases} \left(1 - \frac{1}{t_c}\right) \cdot R_i(t) + \frac{1}{t_c} DRC_i(t), & i = i^* \\ \left(1 - \frac{1}{t_c}\right) \cdot R_i(t), & i \neq i^* \end{cases} \quad (2)$$

where t equals the time at which the served rate value is being updated, which may be at one of the defined periodic 1.66 ms HDR time slots, $t_c$ equals a filter time constant, and $i^*$ indicates the specific $i^{th}$ user selected or otherwise scheduled for service with a desired service rate value indicated via a Data Rate Control (DRC) channel.

In HDR networks, the forward link is rate-controlled rather than power controlled. Each AT 12 determines the highest data rate supported by current reception conditions and returns a corresponding data rate control symbol value via a DRC channel. These DRC values are received at the network from individual users at up to 600 Hz.

With the above utility function, the scheduler of the present invention schedules users in observance of desired minimum data throughput rates associated with those users. In an exemplary embodiment, evaluating the users' utility functions entails differentiating (1), which yields a fairness criteria expressed as, $$\sum_{i=1}^{N} \frac{R_i^* - R_i}{R_i - R_{i,min}} \leq 0, \quad (3)$$

where there are N users, and $R_i^*$ $i=1, 2, \ldots, N$, represents a feasible solution for the average served rates (average past data throughput) and $R_i$ $i=1, 2, \ldots, N$, is the optimum distribution of rates. At a scheduling decision point, the scheduler evaluates the scheduling metric assigned to each of the N users eligible for scheduling. Note that there may be M>N users sharing the air interface but M−N users not eligible for scheduling at a given scheduling decision point. For example, one or more users might have been scheduled for service over a number of HDR time slots at an earlier scheduling decision point and still have one or more allocated time slots remaining. In other cases, given ones of the M users might not be eligible for scheduling owing to unreliable DRC information. Thus, if the scheduler does not have access to a current DRC value for a given user, it might not consider that user in its current scheduling decision evaluation.

The evaluation of the fairness criteria in (3) yields a scheduling metric that is expressed as, $$\frac{DRC_i(t)}{R_i(t) - R_{i,min}}, \quad (4)$$

where $DRC_i$ represents the DRC value for the ith user. It is apparent from the expression in (4) that setting a higher desired minimum data throughput for the $i^{th}$ user generally results in a greater (i.e., more favorable) scheduling metric for that user.

From (4), the scheduler can bias scheduling preference based on the desired minimum data throughputs $\{R_{i,min}\}$ associated with the users. If the network operator desires, users may be grouped according to user class. Users in a preferred class might pay higher service charges to have higher minimum data throughput values assigned to them. With the $(R_i - R_{i,min})$ differential term in the denominator of the scheduling metric, the scheduling metric varies proportionately with the magnitude of $R_{i,min}$. That is, a relatively higher $R_{i,min}$ generally results in a higher scheduling metric.

In some situations, it might be desirable to define a common $R_{i,min}$ for all users. In this case, $R_{i,min}$ still guarantees users of the network 10 a minimum served data rate provided radio conditions permit meeting at least the minimum served rates, but it does not differentiate between users of different classes.

Figure 4:
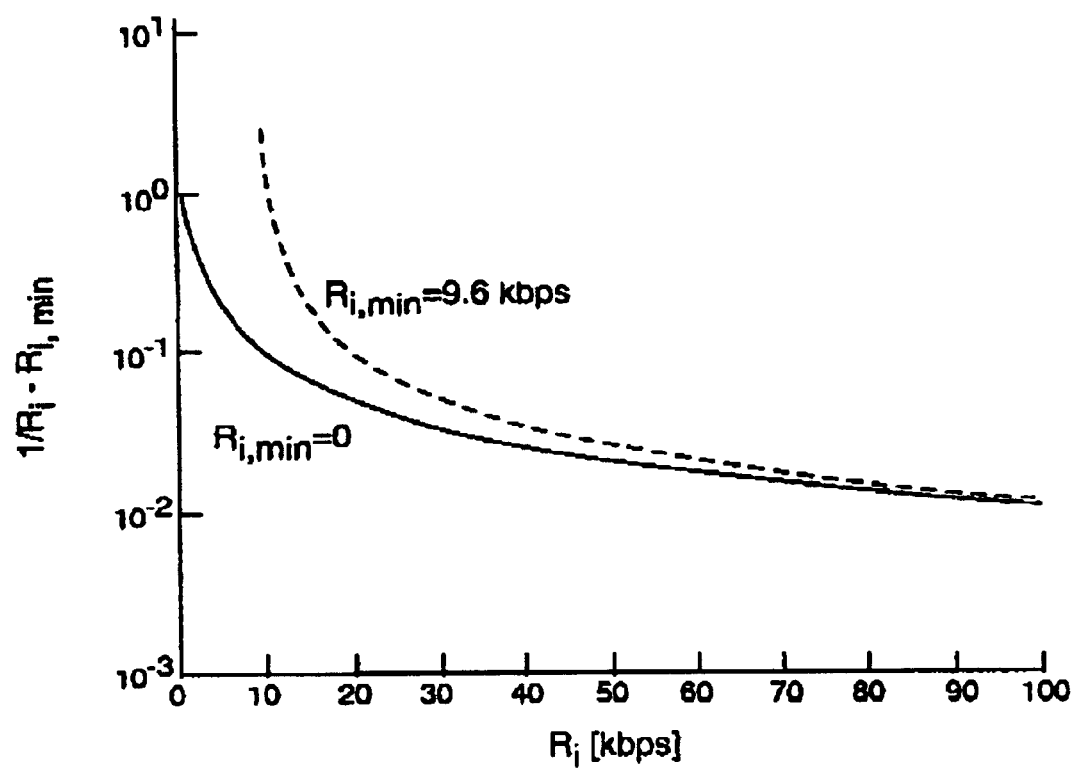
FIG. 4 is graph of known proportional fair scheduling compared to exemplary minimum rate scheduling.

FIG. 4 illustrates the effect of $R_{i,min}$ scheduling biases for a given set of users in contrast to conventional proportional fair scheduling. The graph depicts two curves, with the solid curve corresponding to the average served rate provided to users with proportional fair scheduling, and the dashed curve corresponding to average served rates with minimum-rate scheduling. The graph assumes that all users subject to minimum-rate scheduling are assigned a minimum served rate value of 9.6 Kbps. One may observe that both proportional fair (i.e., $R_{i,min}=0$) and minimum-rate scheduling are similar at the higher data rates, but minimum-rate scheduling prevents users' average served rates from falling defined minimum rate values.

Usage of a common minimum rate value can be convenient for the system operator. Where a common value is desired, the system operator may define a user variable as follows, $$U_i(R_i) = m_i \log(R_i - R_{min}), \quad (5)$$

where $m_i$ equals the user variable for the $i^{th}$ user. The user variable $m_i$ might take one of a number of discrete values corresponding to different users or to different user classes. The variable $m_i$ may also be defined as a real number corresponding to a desired scheduling bias. From (5), one can observe that the magnitude of the utility function $U_i(R_i)$ increases with an increasing $m_i$. Of course, in other variations, the utility function may be made to vary inversely with $m_i$.

Differentiating $U_i(R_i)$ with respect to $R_i$ yields the following scheduling metric, $$m_i \cdot \frac{DRC_i(t)}{R_i(t) - R_{min}}. \quad (6)$$

From (6), it may be observed that class-based user biasing may be accomplished by assigning different $R_{i,min}$ values to different users, possibly based on user class, and/or by assigning different $m_i$ values to different users, preferably but not necessarily based on user class.

One precaution that is advantageous with the above utility functions is the use of a limiting value, $\delta_i$, for use in $(R_i - R_{i,min})$ difference calculations. Since actual radio reception conditions are beyond control of the network 10, it is possible that one or more users have average served rates at or below their minimum rate values. In these instances, the denominator term $(R_i - R_{i,min})$ can be problematic in that it may result in dividing by zero, or may drive the user's scheduling metric negative.

While the scheduler might be adapted to accommodate either problem, it may be preferable to simply define users' scheduling metrics as, $$\frac{DRC_i(t)}{\max(R_i(t) - R_{i,min}, \delta_i)}, \tag{7}$$

where the "max" function selects the maximum of the differential term $R_i - R_{i,min}$ and the limiting value, thereby avoiding zero or negative difference term difficulties.

In some instances, however, the scheduler may use negative differential terms advantageously. For example, use of the above limiting value might be used where it is assumed that serving a user below the desired minimum data throughput rate has no utility. However, setting $R_{i,min}$ less than zero biases the scheduler from a more "proportional fair" approach towards a maximum Carrier-to-Interface (C/I) approach. Maximum C/I scheduling is biased towards serving the user with the best reception condition rather than with the overall fairness of service.

Setting $R_{i,min}$ less than zero for one or more users assumes that there is some utility in serving a user even with zero throughput, which can be interpreted as saying that the user has some tolerance for zero throughput conditions. In this context, larger $|R_{i,min}|$ values indicate a greater tolerance for not being served. In the limit as $|R_{i,min}| \to \infty$, the scheduler using the scheduling metric given in (7), for example, shifts towards a maximum C/I bias. With maximum C/I scheduling, the scheduler attempts to serve the user having the best C/I ratio. Pure C/I scheduling eschews serving fairness and simply schedules the user or users having the best radio reception conditions, thereby maximizing overall or aggregate throughput rather than maintaining minimum user throughputs.

With the present invention, a utility function may be formed as the weighted combination of throughput-based and C/I-based terms, and is expressed as, $$U_i(R_i) = \tau_i R_i + (1 - \tau_i) \log(R_i - R_{i,min}), \tag{8}$$

where $\tau$ serves as a weighting factor that may be adjusted generally or on a per-user basis to bias scheduling between user-throughput and maximum C/I criteria.

From (8), it can be shown that the corresponding scheduling metric is given as, $$\left(\tau_i + \frac{1 - \tau_i}{R_i - R_{i,min}}\right) DRC_i(t). \tag{9}$$

With the scheduling metric of (8), the scheduling priority of individual users (or groups of users) may be balanced between minimum throughput and maximum C/I priorities. This approach permits service providers to strike a balance between observing users' desired minimum throughputs and maintaining overall radio sector throughputs at acceptable levels.

Figure 5:
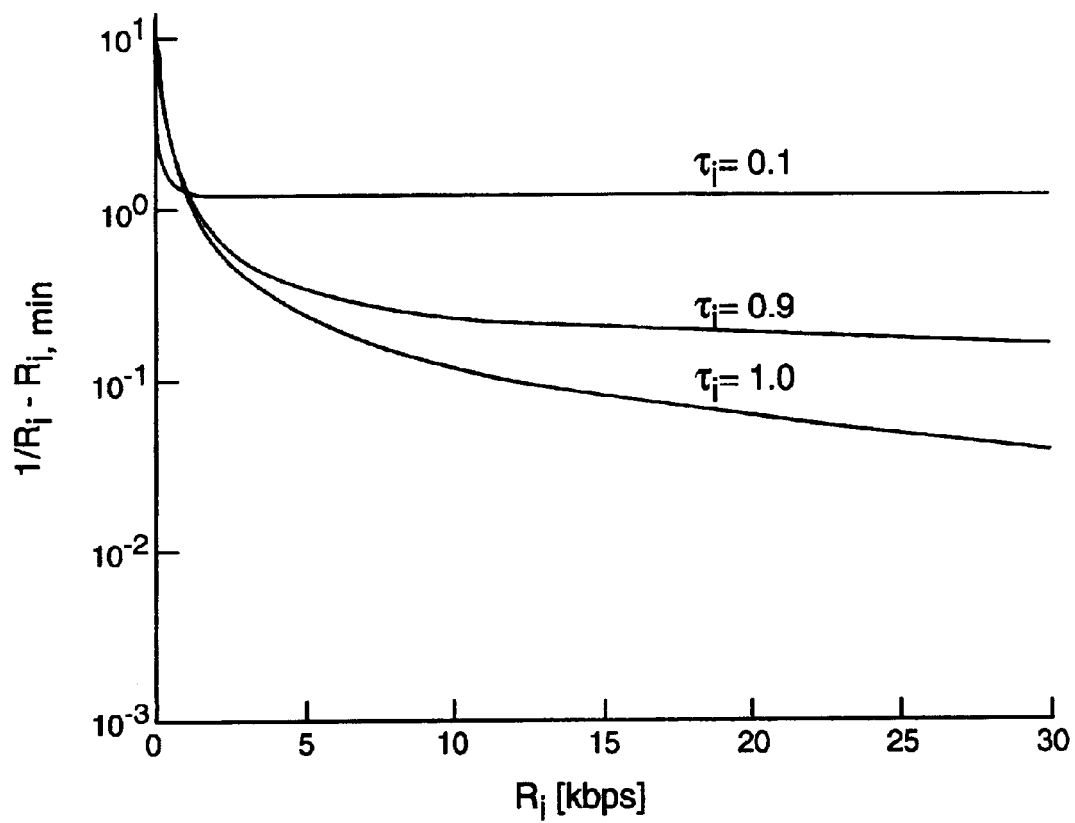
FIG. 5 is a graph of hybrid scheduling that biases proportional fair scheduling towards maximum C/I scheduling.

FIG. 5 illustrates the effect of different weighting factor values. One may observe that by changing the value of the weighting factor $\tau$, this embodiment of the scheduler strikes an adjustable balance between proportional fair and maximum C/I scheduling.

In another embodiment, adaptive biasing accommodates radio link conditions insufficient to support one or more users' minimum desired data throughputs. The scheduling algorithm can be modified to account for the $R_{i,min}$ that can be achieved with a "round-robin" based approach to scheduling. That is, even where radio link conditions do not support desired $R_{i,min}$ values, the scheduler can be configured to provide service that is at least no worse than that obtained by allocating an equal number of time slots to all users. With this approach, $R_{i,min}$ may be expressed as, $$R_{i,min} = \frac{1}{N} \sum_{j=0}^{L-1} \frac{DRC_i(t-j)}{L}, \tag{10}$$

where N equals the number of users sharing the same radio link, and L equals the number of DRC values over which the adaptive $R_{i,min}$ value is developed. Simply put, the minimum desired data throughput for the $i^{th}$ user is adjusted based on the average of the last L service rates requested by that user and the number of users in the system. In this manner, $R_{i,min}$ changes to reflect the $i^{th}$ user's actual radio link conditions.

Figure 6:
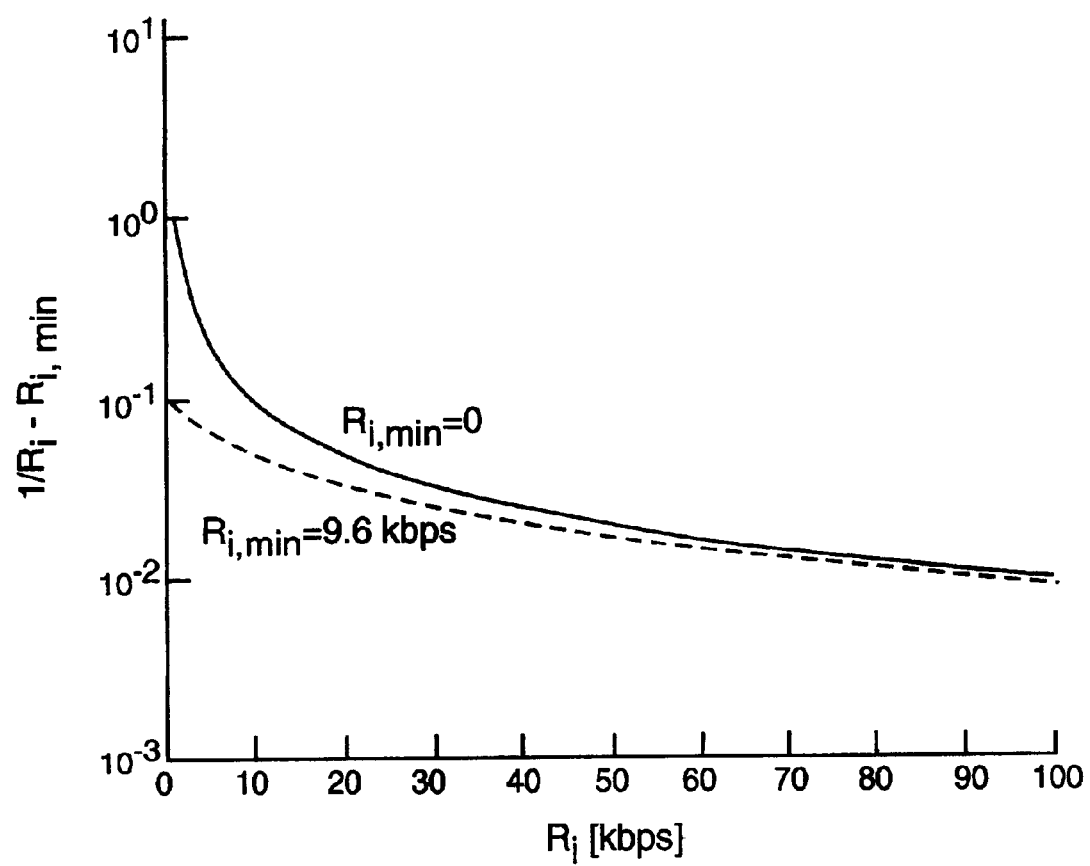
FIG. 6 is a graph alternate exemplary scheduling that balances proportional fair and maximum C/I scheduling.

The aggregate throughput (i.e., the overall data throughput to all users) should be higher with the above approach as compared to a simple round robin scheduler, as the ith user still receives forward link service at peak DRC values and/or when the user's average data throughput is low. FIG. 6 illustrates the effect of the above approach on user scheduling.

User scheduling biased for minimum served rates may also be supplemented with QoS considerations. Fundamentally, QoS-based scheduling considers the permissible latencies associated with data packets queued for deliver to various ones of the users. For example, a user receiving data packets associated with an e-mail or an electronic document might desire a high served rate, but might care very little about the maximum latency of individual data packets. Conversely, a user receiving streaming media, such as audio or video data, might not care about served rate beyond the minimum required by the streaming media application, but typically cares a great deal about packet latency. Without adequate QoS management, the user might suffer degraded audio and video quality.

Conventionally, QoS-based scheduling schedules the user having the largest delay-based metric, which is expressed as, $$\max_i a_i D_i(t), \tag{11}$$

where $a_i = -\log(p_i)/D_{i,max}$, and where $D_{i,max}$ means the maximum allowable delay associated with delivering a data packet to the ith user, $D_i < D_{i,max}$, and $p_i$ equals the probability of violating that maximum delay constraint. This conventional approach to QoS-based scheduling does not account for varying channel conditions and therefore can lead to low utilization of radio resources.

One existing approach that attempts to address at least some of the limitations inherent in (11) is termed the Modified Largest Weighted Delay First (M-LWDF) approach, which has a scheduling metric expressed as, $$\max_i DRC_i a_i D_i(t), \tag{12}$$

where $DRC_i$ is the current requested service rate from the ith user.

In another variant of existing M-LWDF scheduling approaches, the scheduling metric is expressed as, $$\max_i \frac{DRC_i}{E[DRC_i]} \cdot a_i D_i(t), \quad (13)$$

where $E[DRC_i]$ represents the average of the last N DRC values received at the network 10 from the ith user. It is generally believed that (12) or (13) provides similar QoS levels between users, but it should be noted that neither (12) nor (13) provide the same QoS for all users even where all users have the same $p_i$ and $D_i$ values.

In yet another existing approach, the scheduling metric takes on an exponential form and is expressed as, $$\max_i \frac{DRC}{E[DRC_i]} \cdot a_i \exp\left(\frac{a_i D_i(t) - E[aD]}{1 + \sqrt{E[aD]}}\right), \quad (14)$$

where $E[aD]$ represents averaged product values. Generally, (14) outperforms both (12) and (13) at least for the users experiencing the best and worst radio conditions from among those users subject to scheduling.

Still, none of these existing QoS-based scheduling approaches provides users with the needed QoS across changing radio conditions. Consequently, existing approaches can forfeit possible service efficiency by over-serving some users (i.e., providing a higher-than-required QoS) to insure that minimum QoS levels are maintained for other users experiencing less favorable radio conditions.

The present invention approaches QoS-based scheduling in a manner that provides the same (or desired) QoS to users across varying radio conditions. One aspect of QoS-based scheduling in the context of the present invention is to dynamically bias the scheduler based on the current QoS provided to one or more users. If the QoS is better than needed, QoS delay constraints are relaxed, i.e., more delay is tolerated. Conversely, if the QoS is below needed levels, the delay constraint is reduced, i.e., less delay is tolerated.

Dynamic QoS-constraint adjustment introduces a scheduling parameter $\alpha_i$ where i indicates the $i^{th}$ user. The parameter $\alpha_i$ is included in the $i^{th}$ user's utility function, and is updated in essentially real-time, preferably using closed-loop control mechanisms. A first closed-loop control mechanism updates $\alpha_i$ for each data packet incoming to the network for the $i^{th}$ user (at time t) as follows, $$\alpha_i(n) = \begin{cases} \alpha_i(n-1) - p_i \Delta_i, & \text{if } D_i(n) \le D_{i,\max}, \text{else} \\ \alpha_i(n-1) + \Delta_i, \end{cases} \quad (15)$$

where $\Delta_i$ is a step change value defined for $\alpha_i$, and may be set the same for all users (all i), and where n−1 represents the previous value of $\alpha_i$. In (15), if the ith user's QoS constraints are being met, the delay constraint parameter $\alpha_i$ may be reduced in magnitude. Conversely, if the maximum delay associated with delivering the current data packet to the $i^{th}$ user is exceeded (i.e., $D_i > D_{i,max}$), the magnitude of $\alpha_i$ is increased. The magnitude of $\Delta_i$ may be adjusted to balance between stability and tight control of QoS relative to the optimum QoS value.

In a second closed-loop control approach, the delay constraint parameter $\alpha_i$ is updated as follows, $$\alpha_i(n) = \begin{cases} \alpha_i(n-1) - \Delta_i, \text{ if } p_{i,est}(n) \le p_i, \text{ else} \\ \alpha_i(n-1) + \Delta_i, \end{cases} \quad (16)$$

where $p_{i,est}(n) = Pr(D_i > D_{i,max})$, which represents the measured delay violation probability.

Significant flexibility is available in terms of implementation. In one approach, the earlier QoS scheduling metric given in (12) is modified to include the delay constraint parameter $\alpha_i$ as follows, $$\max_i DRC_i \alpha_i a_i D_i(t), \quad (17)$$

Figure 7:
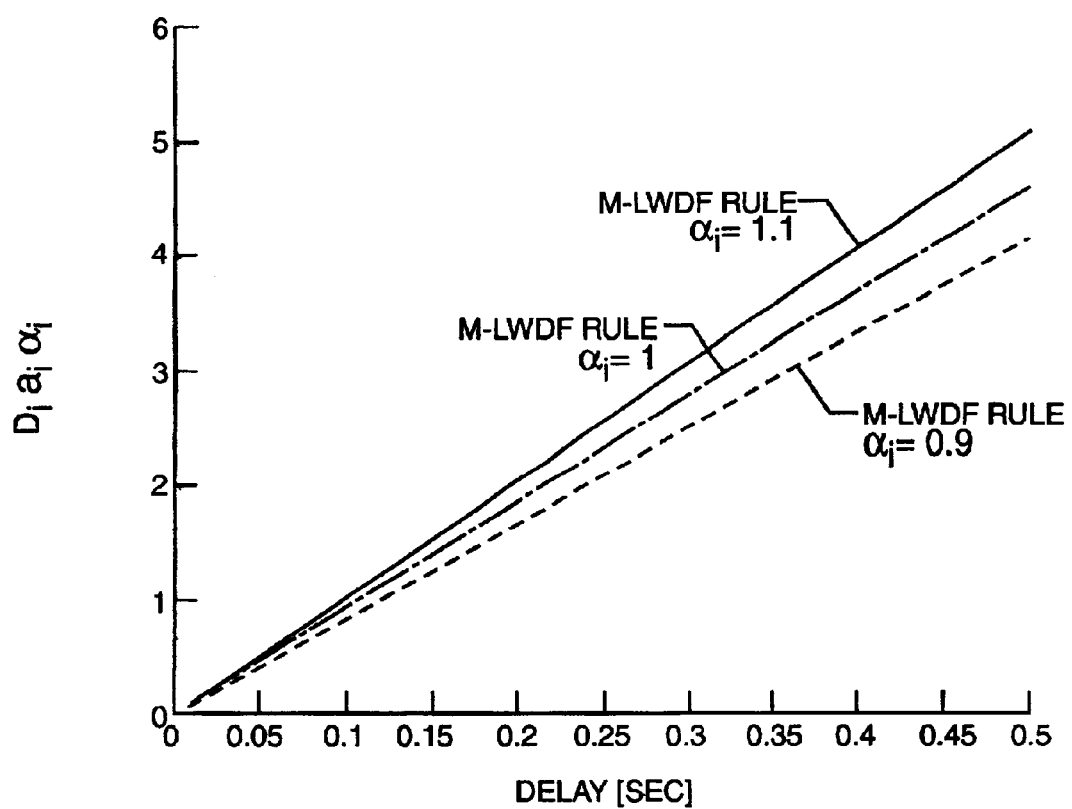
FIG. 7 is a graph of scheduling using an exemplary modified M-LWDF delay utility function.

From (17), one can observe that the scheduling metric for the ith user is dependent upon the magnitude of the delay constraint parameter $\alpha_i$. FIG. 7 illustrates operation of the scheduling metric given in (17) for differing values of the delay constraint parameter $\alpha_i$.

In other variations, the delay constraint parameter $\alpha_i$ may be applied to the exponential scheduling metric given above in (14). Thus modified, the exponential scheduling metric is expressed as, $$\max_i \frac{DRC_i}{E[DRC_i]} \cdot a_i \cdot \exp\left(\frac{a_i \cdot \alpha_i D_i(t) - E[\alpha aD]}{1 + \sqrt{E[\alpha aD]}}\right). \quad (18)$$

Figure 8:
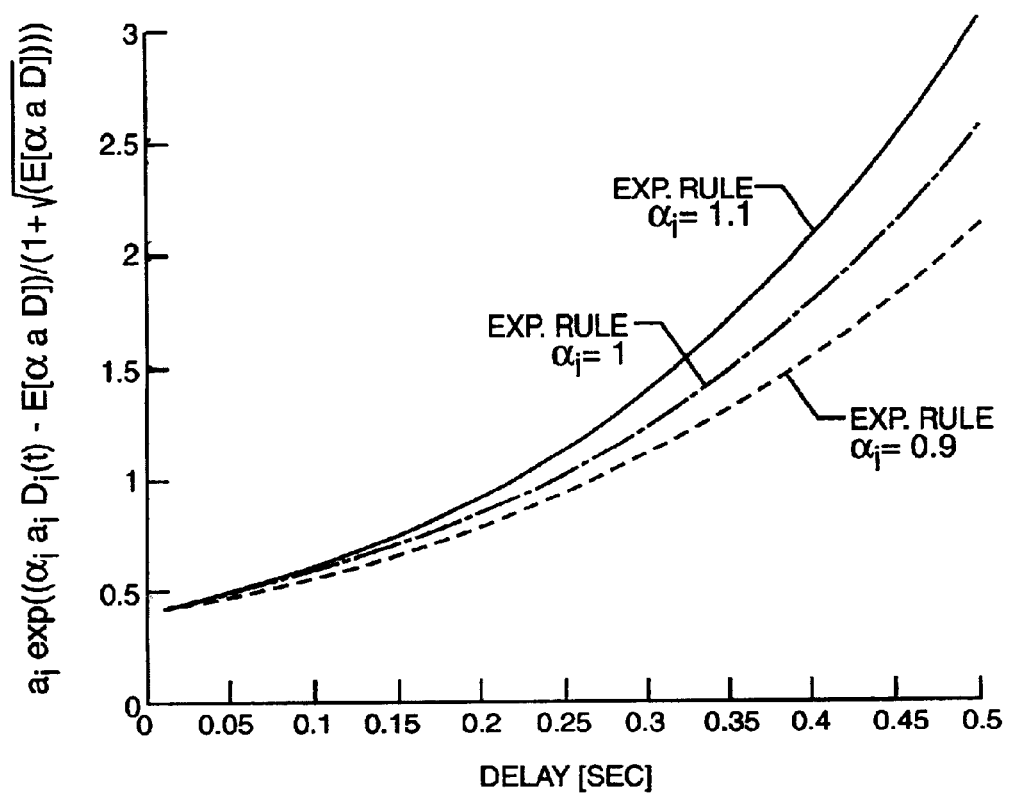
FIG. 8 is a graph of scheduling using an exemplary modified exponential delay utility function.

FIG. 8 illustrates operation of the scheduling metric given in (18) for $p_i$ equals 0.01, $D_{i,max}$ equals 0.5 seconds, and $E[\alpha D]$ equals 0.25 seconds. If QoS requirements for user i are violated, the delay constraint parameter $\alpha_i$ is increased, and if QoS is not violated $\alpha_i$ is decreased.

Figure 9:
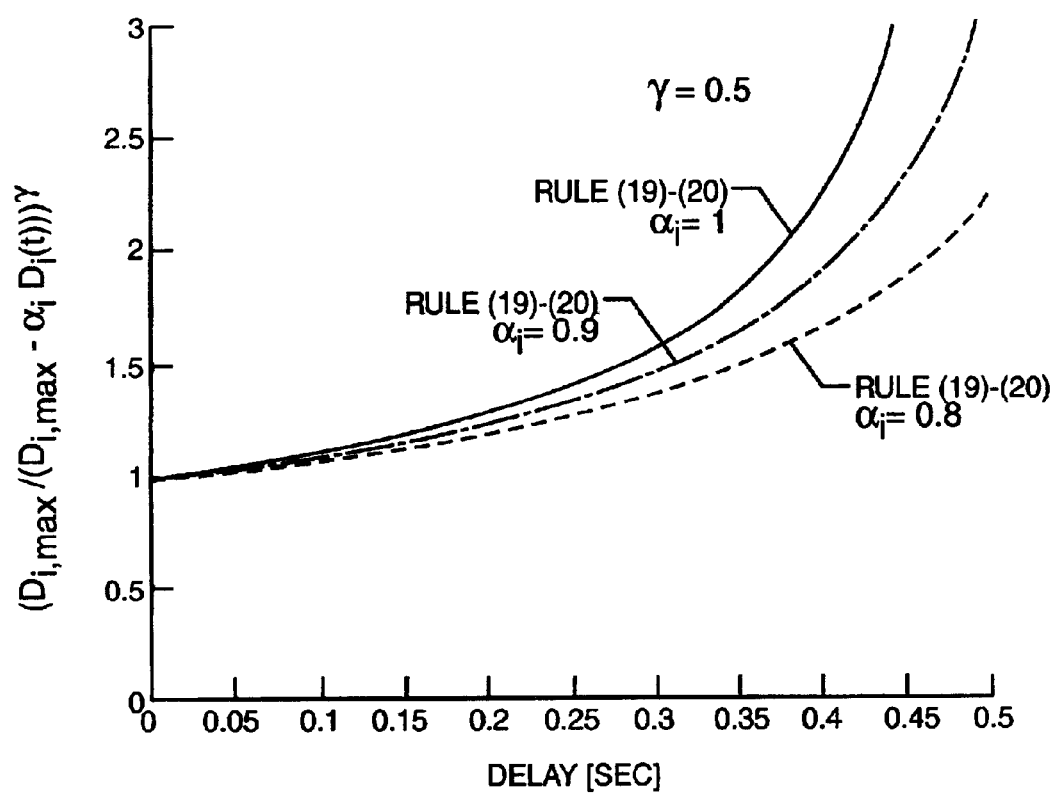
FIG. 9 is a graph of exemplary rule-based scheduling.

With the above foundation in place, an exemplary scheduling metric may be defined that provides for both deterministic and probabilistic QoS. Here, deterministic QoS means no violation of QoS delay constraints. Two such exemplary rules (scheduling metrics) may be expressed as, $$\max\left(\frac{DRC}{E[DRC_i]}\right) \cdot \left(\frac{D_{i,\max}}{D_{i,\max} - \alpha_1 D_i(t)}\right)^{\gamma}, \quad (19)$$

or $$\max\left(\frac{DRC_i}{R_i - R_{i,\min}}\right) \cdot \left(\frac{D_{i,\max}}{D_{i,\max} - \alpha_1 D_i(t)}\right)^{\gamma}, \quad (20)$$

where $\gamma$ is a constant that determines the aggressiveness of the scheduling rule, and should be optimized in a given network 10. FIG. 9 illustrates scheduling curves for the scheduling rules expressed in (19) and (20) with varying values of the delay constraint parameter $\alpha_i$, and where the constant $\gamma$ is set to a value of 0.5.

Applying the delay constraint parameter aids service efficiency by setting QoS levels high enough to insure that users in the worst radio conditions receive at least the minimum QoS level needed, but avoids providing better-than-needed QOS levels to users in good reception conditions.

Marrying the concepts of minimum rate scheduling and QoS scheduling, the scheduler of the present invention may be adapted to use utility functions incorporating both rate-based and QoS-based elements. For example, an exemplary utility function that may be assigned to users is expressed as, $$U_i(R_i) + U_i^D(D_i), \quad (21)$$

where the $R_i$ term (throughput utility function) incorporates the minimum rate associated with the $i^{th}$ user subject to scheduling and the $D_i$ term (delay utility function) incorporates the QoS-related delay constraints associated with the $i^{th}$ user.

With (21), one may consider the following optimization problem, $$\text{maximize} \sum_{i=1}^{N} U_i(R_i) + U_i^P(D_i), \quad (22)$$

$$\text{subject to} \sum_{i=1}^{N} R_i < C$$

over $R_i \geq R_{i,min}$, where C denotes the aggregate data throughput capacity available to serve all users. Note that the set of served rates $R_i$ for all users may be express as vector R equal to [$R_1$, $R_2$, ..., $R_N$] for N users.

The assumption is that the objective function $U_i(R_i) + U_i^P(D_i)$ is differentiable and strictly concave, and further assumes that the feasibility region (solution set) of the objective function is convex. Assuming a convex feasibility region is essentially equivalent to assuming that the objective function is monotonic. The above optimization problem may be applied directly to scheduling of the air interface link(s) in the network 10.

For deterministic QoS scheduling, the delay utility function above should be such that $U_i^P(0)=0$, and $U_i^P(D_{i,min})=-\infty$. For probabilistic QoS, however, $U_i^P(D_{i,max})=-M$, where M equals a large positive number. As shown in scheduling metrics above (e.g., (17)), the delay utility function may be made dependent on the delay constraint parameter $\alpha_i$, and a closed-loop algorithm can be applied to dynamically adjust scheduling metrics to maintain the desired QoS for each user subject to scheduling. Note that closed-loop control may also be applied to the throughput utility function (i.e., applied to utility function terms involving $R_i$).

Exemplary delay utility functions are expressed as, $$U_i^P(D_i) = -\log\left(\frac{D_{i,max}}{D_{i,max} - \alpha_i D_i}\right), \quad (23)$$

or $$U_i^P(D_i) = -\frac{\alpha_i D_i}{D_{i,max} - \alpha_i D_i}. \quad (24)$$

Thus, the utility functions associated with users may be expressed as composite utility functions combining both throughput and delay terms. In (21), the composite utility function was expressed as a sum-of-terms but it may be formed as a product expressed as follows, $$U_i(R_i, D_i) = U_i(R_i) \cdot U_i(D_i), \quad (25)$$

where $U_i(R_i)$ is assumed to include a $R_{i,min}$ term.

In general, the present invention may be used to implement an air interface scheduler that performs user scheduling biased with respect to minimum desired data rates associated with the users, and, optionally, biased with respect to desired QoS levels associated with the users. As such, the above expressions for user utility functions from which the various scheduling metrics were derived are only exemplary representations of scheduling in accordance with the present invention. These examples should not be construed as limiting the present invention rather the present invention is limited only by the scope of the following claims, and the reasonable equivalents thereof.

What is claimed is:

1. A method of scheduling a plurality of users sharing use of an air interface in a wireless communication network, the method comprising:

calculating a scheduling metric for each user, said scheduling metric being dependent on a minimum data rate defined for the user;

defining the scheduling metrics such that assigning a higher minimum data rate value to a given user preferentially biases scheduling of that user;

defining the scheduling metrics such that a magnitude of the scheduling metric for each user depends on a differential value between an average served data rate of the user and the minimum data rate defined for the user, wherein users having smaller differential values are preferentially scheduled; and scheduling users based on the scheduling metrics.

2. The method of claim 1, wherein calculating a scheduling metric for each user comprises calculating scheduling metrics for the plurality of users at a scheduling decision point.

3. The method of claim 2, wherein scheduling users based on the scheduling metrics comprises selecting the user having the greatest scheduling metric for a defined interval of service via the air interface.

4. The method of claim 3, further comprising defining the scheduling metrics such that the magnitudes of the scheduling metrics vary proportionately with the minimum data rates defined for the users, so that scheduling is preferentially biased towards users having higher defined minimum data rates.

5. The method of claim 1, further comprising defining a minimum data rate for each user based upon a user class of each user, and wherein different user classes have different minimum data rates such that scheduling is biased by user class.

6. The method of claim 1, further comprising:

defining a common minimum data rate for the plurality of users; and including a user variable in the scheduling metric of each user such that scheduling of the plurality of users is biased by the user class variables.

7. The method of claim 6, further comprising setting a value of the user variable for each user based on a user class associated with the user, wherein different user classes have different user variable values such that scheduling is biased by user class.

8. The method of claim 8, wherein calculating the scheduling metric for each user comprises differentiating a utility function that depends on the minimum data rate defined far the user.

9. The method of claim 8, wherein differentiating the utility function comprises differentiating $\log(R_i - R_{i,min})$, where $R_i$ equals the average served data rate of the $i^{th}$ user and $R_{i,min}$ equals the minimum data rate defined for the $i^{th}$ user.

10. The method of claim 1, further comprising defining the scheduling metric for each user to depend upon a QoS delay constraint associated with the user in addition to the minimum data rate defined for the user, wherein the QoS delay constraint defines a maximum delay for pending data to be delivered to the user via the air interface.

11. The method of claim 10, further comprising dynamically updating the QoS delay constraint for each user based on whether the QoS delay constraint is violated.

12. The method of claim 10, wherein dynamically updating the QoS delay constraint increases the scheduling preference of the user if the QoS delay constraint is violated, and decreases the scheduling preference of the user if the QoS delay constraint is not violated.

13. A method of scheduling use of an air interface shared by users of a wireless communication network, the method comprising:

assigning a utility function to each user that is dependent on an average served rate and a desired minimum data rate associated with the user, wherein the utility function assigned to each user is dependent an a differential value between the average served rate and the desired minimum data rate associated with the user;

evaluating the utility function for each user to determine a scheduling metric for the user, wherein a magnitude of the scheduling metric varies proportionately to the minimum data rate; and scheduling the user having the greatest scheduling metric magnitude.

14. The method of claim 13, wherein the users are divided into a plurality of user classes, and further comprising assigning different minimum data rates to different user classes.

15. The method of claim 14, further comprising assigning a relatively higher minimum data rate to users in a preferred user class such that scheduling is preferentially biased towards users in the preferred user class.

16. The method of claim 13, wherein users are divided into a plurality of user classes, and further comprising:
assigning a common minimum data rate to all users; and
including a class variable in the utility function assigned to each user to bias scheduling based on a user class.

17. The method of claim 13, further comprising:
defining a scheduling preference variable for each; and
including the scheduling preference variable as a multiplier in the utility function assigned to each user, such that user scheduling is biased by the scheduling preference values.

18. The method of claim 17, further comprising assigning a value to the scheduling preference variable for each user based on a user class associated with the user, such that users in a preferred class are assigned preferential scheduling preference values.

19. The method of claim 17, further comprising assigning a value to the scheduling preference value for each user based on one of a plurality of service plans assigned to the user, wherein each of said plurality of service plans has a different scheduling preference value.

20. The method of claim 13, wherein me utility function is defined as $U_i(R_i)=\log(R_i=R_{i,min})$, where $R_i$ is the measured data throughput of the $i^{th}$ user and $R_{i,min}$ is the minimum data throughput associated with the $i^{th}$ user.

21. The method of claim 20, wherein evaluating the utility function for each user comprises differentiating $U_i(R_i)$, such that the scheduling metric vanes inversely with the magnitude of $(R_i-R_{i,min})$.

22. The method of claim 21, further comprising:
defining a minimum value for (Ri-Ri,min) to use in determining the scheduling metric; and
using the minimum value to calculate the scheduling metric if (Ri-Ri,min) is equal to or less than zero.

23. The method of claim 13, further comprising:
defining the utility function associated with each user as the sum of a throughput-based term dependent on the minimum data rate associated with the user, and a C/I-based term dependent on current reception conditions associated with the user;
setting weighting coefficients for multiplying the throughput-based and C/I-based terms to achieve a desired scheduling bias between scheduling users to maintain desired minimum data rates versus scheduling users to maintain a desired aggregate throughput.

24. The method of claim 13, further comprising:
associating a delay constraint with each user, wherein the delay constraint depends on a QoS desired by the user;
increasing the scheduling preference of the user when the delay constraint is violated; and
decreasing the scheduling preference of the user when the delay constraint is not violated.

25. The method of claim 24, wherein associating a delay constraint with each user comprises defining the utility function assigned to each user as the product of a first term dependent on the minimum data throughput associated with the user, and a second term dependent on the delay constraint associated with the user.

26. The method of claim 24, wherein associating a delay constraint with each user comprises defining the utility function assigned to each user as the sum of a first term dependent on the minimum data throughput associated with the user, and a second term dependent on the delay constraint associated with the user.

27. A wireless communication network comprising:
at least one radio base station to serve a plurality of users over a shared air interface; and
a scheduler to schedule use of the air interface by the plurality of users, the scheduler comprising:
a metric calculator to calculate a scheduling metric for each user, wherein said scheduling metric is calculated based on a minimum data rate defined for the user, and further wherein the metric calculator calculates the scheduling metric for each user based on a differential value between an average served rate of the user ($R_i$) and the minimum data rate of the user ($R_{i,min}$), such that the scheduling metric becomes more favorable as $R_i$ approaches $R_{i,min}$; and
a comparator to compare the scheduling metrics to identify the user having the most favorable scheduling metric, such that the identified user is scheduled for service via the air interface.

28. The wireless communication network of claim 27, wherein the scheduler defines the scheduling metric for each user as the ratio of a requested data rate from the user to the difference value for the user ($R_i-R_{i,min}$), such that the scheduling metric becomes more favorable as the requested data rate increases.

29. The wireless communication network of claim 28, wherein the network comprises a TIA/EIA/IS-856 HDR network, and wherein requested data rates are received by the network from the users as Data Rate Control (DRC) values.

30. The wireless communication network of claim 29, wherein the scheduler defines the scheduling metric for each user as a function of $DRC_i/(R_i-R_{i,min})$, such that the scheduling metric for the $i^{th}$ user becomes more favorable with higher $DRC_i$ values, and with smaller difference values $(R_i-R_{i,min})$.

31. The wireless communication network of claim 27, wherein the scheduler defines the scheduling metric for each user to depend on the inverse of the difference value $(R_i-R_{i,min})$, such that as the magnitude of the differential value decreases, the magnitude of the scheduling metric increases, and wherein a greater scheduling metric magnitude corresponds to a more favorable scheduling metric.

32. The wireless communication network of claim 27, wherein scheduling preference is biased by assigning different minimum data rate values to different users.

33. The wireless communication network of claim 27, wherein all users are assigned a common minimum data rate, and wherein scheduling preference is biased by including a user variable in the scheduling metric.

34. The wireless communication network of claim 33, wherein the user variable is a multiplier of the scheduling metric, such that a greater multiplier results in a more favorable scheduling metric.

35. The wireless communication network of claim 27, wherein the metric calculator calculates the scheduling metric for each user in further dependence on a delay constraint parameter.

36. The wireless communication network of claim 35, wherein the metric calculator calculates the scheduling mettle for each user based on a utility function assigned to each user, arid wherein the utility function is a sum of a first term dependent on the minimum data rate defined for the user, and a second term dependent on the delay constraint parameter.

37. The wireless communication network of claim 35, wherein the metric calculator calculates the scheduling metric for each user based on a utility function assigned to each user, and wherein the utility function is a product of a first term dependent on the minimum data rate defined for the user, and a second term dependent on the delay constraint parameter.

38. The wireless communication network of claim 35, wherein the scheduler dynamically updates the delay constraint parameter for each user in dependence on whether or not a QoS desired by the user is being met, such that the scheduling metric of the user becomes more favorable if the desired QoS is not met, and less favorable if the desired QoS is met.

39. A scheduler to schedule use of a wireless communication network air interface that is shared by a plurality of users, the scheduler comprising:
a metric calculator to calculate a scheduling metric for each user, wherein said scheduling metric is calculated based on a minimum data rate defined for the user, wherein the metric calculator calculates the scheduling metric for each user based on a differential value between an average served rate of the user ($R_i$) and the minimum data rate of the user ($R_{i,min}$), such that the scheduling metric becomes more favorable as $R_i$ approaches $R_{i,min}$; and)
a comparator to compare the scheduling metrics to identify the user having the most favorable scheduling metric, such that the identified user is scheduled for service via the air interface.

40. The scheduler of claim 39, wherein the scheduler defines the scheduling metric of a requested data rate from the user to the differential value for the user ($R_i-R_{i,min}$), such that the scheduling metric becomes more favorable as the requested data rate increases.

41. The scheduler of claim 40, wherein the network comprises a TIA/EIA/IS-856 HDR network, and wherein requested data rates are received by the network from the users as Date Rate Control (DRC) values.

42. The scheduler of claim 41, wherein the scheduler defines the scheduling metric for each user as a function of $DRC_i/(R_i-R_{i,min})$, such that the scheduling metric for the $i^{th}$ user becomes more favorable with higher DRC, values, and with smaller differential values ($R_i-R_{i,min}$).

43. The scheduler of claim 39, wherein the scheduler defines the scheduling metric for each user to depend on We inverse of the differential value ($R_i-R_{i,min}$), such that as the magnitude of the differential value decreases, the magnitude of the scheduling metric increases, and wherein a greater scheduling metric magnitude corresponds to a more favorable scheduling metric.

44. The scheduler of claim 39, wherein scheduling preference is biased by assigning different minimum data rate values to different users.

45. The scheduler of claim 39, wherein all users are assigned a common minimum data rate, and wherein scheduling preference is biased by including a user variable in the scheduling metric.

46. The scheduler of claim 45, wherein the user variable is a multiplier of the scheduling metric, such that a greater multiplier results in a more favorable scheduling metric.

47. The scheduler of claim 39, wherein the metric calculator calculates the scheduling metric for each user further based on a delay constraint parameter.

48. The scheduler of claim 47, wherein the metric calculator calculates the scheduling metric for each user based on a utility function assigned to each user, and wherein the utility function is a sum of a first term dependent on the minimum data rate defined for the user, and a second term dependent on the delay constraint parameter.

49. The scheduler of claim 47, wherein the metric calculator calculates the scheduling metric for each user based on a utility function assigned to each user, and wherein the utility function is a product of a first term dependent on the minimum data rate defined for the user, and a second term dependent on the delay constraint parameter.

50. The scheduler of claim 47, wherein the scheduler dynamically updates the delay constraint parameter for each user based on whether or not a QoS desired by the user is being met, such that the scheduling metric of the user becomes more favorable if the desired QoS is not met, and less favorable if the desired QoS is met.

* * * * *

UNITED STATES PATENT AND TRADEMARK OFFICE
CERTIFICATE OF CORRECTION

PATENT NO. : 6,917,812 B2
APPLICATION NO. : 10/005980
DATED : July 12, 2005
INVENTOR(S) : Damnjanovic It is certified that error appears in the above-identified patent and that said Letters Patent is hereby corrected as shown below:

On the Title Page, in Field (56), under "OTHER PUBLICATIONS", in Column 2, Line 1, delete "Qos" and insert -- QoS --, therefor.

In Column 5, Line 25, in Equation "2", delete "$i \neq 1^*$" and insert -- $i \neq i^*$ --, therefor.

In Column 7, Line 48, Equation (8), delete "$U_i(R_i)=\tau_i R_i+(I-\tau_i)\log(R_i-R_{i,min})$," and insert -- $U_i(R_i) = \tau_i R_i + (1 - \tau_i) \log(R_i - R_{i,min})$, --, therefor.

In Column 9, Lines 13-16, Equation (14), delete "$\max_i \frac{DRC}{E[DRC_i]} \cdot a_i \exp\left(\frac{a_i D_i(t) - E[aD]}{1 + \sqrt{E[aD]}}\right)$,"

and insert -- $\max_i \frac{DRC_i}{E[DRC_i]} \cdot a_i \exp\left(\frac{a_i D_i(t) - E[aD]}{1 + \sqrt{E[aD]}}\right)$, --, therefor.

In Column 10, Lines 17-20, Equation (18), delete "$\max_i \frac{DRC}{E[DRC_i]} \cdot a_i \exp\left(\frac{a_i D_i(t) - E[aD]}{1 + \sqrt{E[aD]}}\right)$,"

and insert -- $\max_i \frac{DRC_i}{E[DRC_i]} \cdot a_i \exp\left(\frac{a_i \alpha_i D_i(t) - E[\alpha aD]}{1 + \sqrt{E[\alpha aD]}}\right)$. --, therefor.

In Column 10, Lines 32-35, Equation (19), delete "$\max\left(\frac{DRC}{E[DRC_i]}\right) \cdot \left(\frac{D_{i,max}}{D_{i,max} - \alpha_1 D_i(t)}\right)^\gamma$,"

and insert -- $\max\left(\frac{DRC_i}{E[DRC_i]}\right) \cdot \left(\frac{D_{i,max}}{D_{i,max} - \alpha_i D_i(t)}\right)^\gamma$ --, therefor.

In Column 10, Lines 36-39, Equation (20), delete "$\max\left(\frac{DRC_i}{R_i - R_{i,min}}\right) \cdot \left(\frac{D_{i,max}}{D_{i,max} - \alpha_1 D_i(t)}\right)^\gamma$,"

and insert -- $\max\left(\frac{DRC_i}{R_i - R_{i,min}}\right) \cdot \left(\frac{D_{i,max}}{D_{i,max} - \alpha_i D_i(t)}\right)^\gamma$ --, therefor.

UNITED STATES PATENT AND TRADEMARK OFFICE
CERTIFICATE OF CORRECTION

PATENT NO. : 6,917,812 B2
APPLICATION NO. : 10/005980
DATED : July 12, 2005
INVENTOR(S) : Damnjanovic It is certified that error appears in the above-identified patent and that said Letters Patent is hereby corrected as shown below:

In Column 10, Line 51, delete "QOS" and insert -- QoS --, therefor.

In Column 12, Line 40, in Claim 8, delete "8" and insert -- 1 --, therefor.

In Column 12, Line 42, in Claim 8, delete "far" and insert -- for --, therefor.

In Column 13, Line 25, in Claim 17, delete "each;" and insert -- each user; --, therefor.

In Column 13, Line 41, in Claim 20, delete "me" and insert -- the --, therefor.

In Column 13, Line 42, in Claim 20, delete "($R_i$=$R_{i,\min}$)" and insert -- ($R_i$-$R_{i,\min}$) --, therefor.

In Column 13, Line 47, in Claim 21, delete "vanes" and insert -- varies --, therefor.

In Column 13, Line 50, in Claim 22, delete "(Ri-Ri,min)" and insert -- ($R_i$-$R_{i,\min}$) --, therefor.

In Column 13, Line 53, in Claim 22, delete "(Ri-Ri,min)" and insert -- ($R_i$-$R_{i,\min}$) --, therefor.

In Column 15, Line 9, in Claim 36, delete "mettle" and insert -- metric --, therefor.

In Column 15, Line 39, in Claim 39, delete "and)" and insert -- and --, therefor.

In Column 15, Line 45, in Claim 40, after "metric" insert -- for each user as the ratio --.

In Column 16, Line 8, in Claim 42, delete "DRC," and insert -- $DRC_i$ --, therefor.

UNITED STATES PATENT AND TRADEMARK OFFICE
CERTIFICATE OF CORRECTION

PATENT NO. : 6,917,812 B2  Page 3 of 3
APPLICATION NO. : 10/005980
DATED : July 12, 2005
INVENTOR(S) : Damnjanovic It is certified that error appears in the above-identified patent and that said Letters Patent is hereby corrected as shown below:

In Column 16, Line 11, in Claim 43, delete "We" and insert -- the --, therefor.

Signed and Sealed this

Ninth Day of September, 2008

JON W. DUDAS
*Director of the United States Patent and Trademark Office*